(12) United States Patent
Miyazato et al.

(10) Patent No.: US 8,159,316 B2
(45) Date of Patent: Apr. 17, 2012

(54) HIGH-FREQUENCY TRANSMISSION LINE CONNECTION STRUCTURE, CIRCUIT BOARD, HIGH-FREQUENCY MODULE, AND RADAR DEVICE

(75) Inventors: Kentaro Miyazato, Kirishima (JP); Kazuki Hayata, Soraku-gun (JP); Yuji Kishida, Soraku-gun (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/681,087

(22) PCT Filed: Dec. 27, 2008

(86) PCT No.: PCT/JP2008/073872
§ 371 (c)(1),
(2), (4) Date: Mar. 31, 2010

(87) PCT Pub. No.: WO2009/084697
PCT Pub. Date: Jul. 9, 2009

(65) Prior Publication Data
US 2010/0245155 A1    Sep. 30, 2010

(30) Foreign Application Priority Data
Dec. 28, 2007  (JP) .................................. 2007-341477

(51) Int. Cl.
*H01P 3/00*    (2006.01)
(52) U.S. Cl. ......................................................... 333/239
(58) Field of Classification Search .................... 333/328
See application file for complete search history.

(56) References Cited

U.S. PATENT DOCUMENTS

| 5,982,256 | A | * | 11/1999 | Uchimura et al. | ............ | 333/239 |
| 6,515,562 | B1 | * | 2/2003 | Takenoshita et al. | ......... | 333/248 |
| 2006/0145777 | A1 | | 7/2006 | Mueller | | |

FOREIGN PATENT DOCUMENTS

| JP | 10-135713 | 5/1998 |
| JP | 11-308001 | 11/1999 |
| JP | 11-340701 | 12/1999 |
| JP | 2000-252712 | 9/2000 |
| JP | 2002-208806 | 7/2002 |

(Continued)

OTHER PUBLICATIONS

Yan Ding et al., "Substrate Integrated Waveguide-to-Microstrip Transition in Multilayer Substrate" IEEE Transactions on Microwave Theory and Techniques, vol. 55, No. 12, pp. 2839-2844, Dec. 2007.

(Continued)

*Primary Examiner* — Timothy A Brainard
(74) *Attorney, Agent, or Firm* — DLA Piper LLP (US)

(57) ABSTRACT

The invention relates to a high-frequency transmission line connection structure, a circuit board having the connection structure, a high-frequency module having the circuit board, and a radar apparatus. A first laminated waveguide sub-line part (21) includes a pair of main conductor layers that oppose each other in a thickness direction with a dielectric layer (31) having the same thickness as a dielectric layer (31) of a microstrip line (1) interposed therebetween. A second laminated waveguide sub-line part (22) includes dielectric layers (31, 32) thicker than the dielectric layer of the first laminated waveguide sub-line part (21). A laminated waveguide main-line part (23) includes dielectric layers (31, 32, 33) thicker than the dielectric layers of the second laminated waveguide sub-line part (22). A conversion part (10) connected to the microstrip line (1) is formed by integrating with an upper main conductor layer constituting the respective line parts.

11 Claims, 10 Drawing Sheets

FOREIGN PATENT DOCUMENTS

| | | |
|---|---|---|
| JP | 2004-135095 | 4/2004 |
| JP | 2006-157289 | 6/2006 |
| JP | 2008271295 A | 11/2008 |
| JP | 2008-300934 | 12/2008 |

OTHER PUBLICATIONS

Extended European search report dated Jul. 7, 2011 for corresponding European 08867432.0.

* cited by examiner

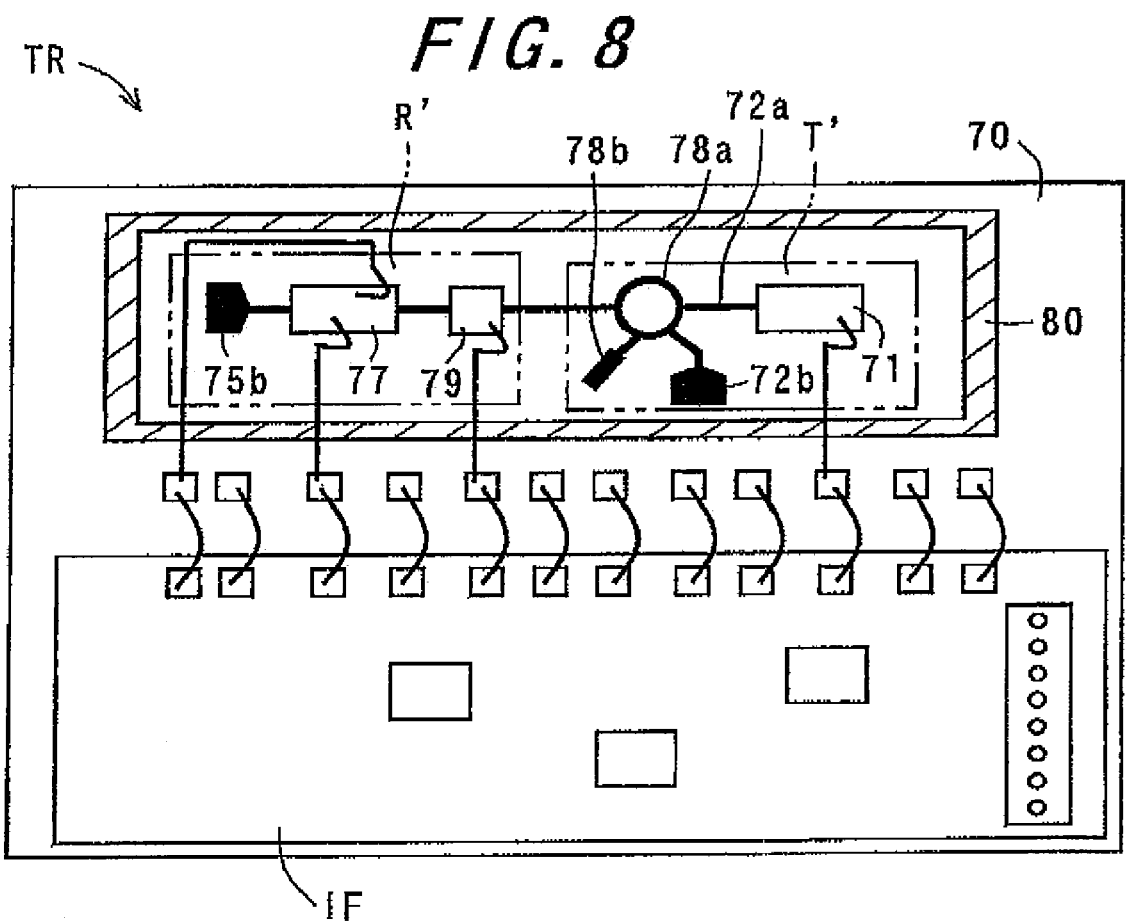

HIGH-FREQUENCY TRANSMISSION LINE CONNECTION STRUCTURE, CIRCUIT BOARD, HIGH-FREQUENCY MODULE, AND RADAR DEVICE

CROSS-REFERENCE TO THE RELATED APPLICATIONS

This application is a national stage of international application No. PCT/JP2008/073872, filed on Dec. 27, 2008, and claims the benefit of priority under 35 USC 119 to Japanese Patent Application No. 2007-341477, filed on Dec. 28, 2007, the entire contents of which are incorporated herein by reference.

TECHNICAL FIELD

The present invention relates to a connection structure between a high-frequency transmission line conductor and a laminated waveguide which are mainly used in the microwave band or the millimeter wave band, a circuit board having the connection structure, and a high-frequency module having the circuit board, and a radar apparatus.

BACKGROUND ART

In circuit design of millimeter wave circuits, there is known a structure in which a microstrip line, which is converted from a high-frequency transmission line such as a microstrip line connected to a semiconductor device or a coplanar line connected to a semiconductor device, is connected (converted) to a laminated waveguide.

A connection structure disclosed in Japanese Unexamined Patent Publication JP-A 2000-252712 is a structure in which a strip conductor of a microstrip line is disposed so as to intersect a longitudinal axis of a slot of a laminated waveguide, and the microstrip line is coupled with the laminated waveguide via a slot formed in a ground conductor.

However, in the connection structure disclosed in JP-A 2000-252712, an electromagnetic coupling with the strip conductor is achieved via the slot. Therefore, in S-parameters, a frequency bandwidth where reflected waves (S11) have −20 dB or lower is 3.7 GHz, and thus, the fractional bandwidth is small at a desired design frequency of 76.5 GHz. Therefore, it cannot be said that reflected waves have excellent frequency characteristics.

A waveguide/microstrip line converter disclosed in JP-A 2002-208806 has a configuration such that a strip conductor of a microstrip line is electrically connected to an upper main conductor layer of the waveguide, a ground conductor of the microstrip line is electrically connected to a lower main conductor layer of the waveguide, and the strip conductor is formed into a tapered shape so as to achieve an impedance matching therebetween.

However, in the surface having such a tapered portion, as the width of the tapered portion becomes closer to the width of the waveguide, the electric field distribution of signals propagating through the microstrip line broadens in the width direction of the tapered portion and has a different distribution from the electric field distribution of the waveguide. Therefore, electromagnetic waves leak at a connection portion and a conversion loss associated with a mode conversion increases.

DISCLOSURE OF INVENTION

The invention has been made in view of such problems, and an object of the invention is to provide a high-frequency transmission line connection structure which has excellent frequency characteristics for reflected waves and is capable of lowering a conversion loss associated with a mode conversion and to provide a circuit board having the connection structure and a high-frequency module having the circuit board and a radar apparatus.

A high-frequency transmission line connection structure according to an embodiment of the invention is a high-frequency transmission line connection structure, for electrically connecting a high-frequency transmission line conductor and a laminated waveguide to each other, the laminated waveguide comprising a first laminated waveguide, a second laminated waveguide, and a common line part provided between the first laminated waveguide and the second laminated waveguide.

The first laminated waveguide comprises a sub-line part which is connected to the high-frequency transmission line conductor, a main-line part which is connected to the sub-line part, and a conversion part electrically connected to the high-frequency transmission line conductor. The sub-line part comprises a dielectric layer, a pair of sub-line part main conductor layers that oppose each other in a thickness direction with the dielectric layer interposed therebetween, and an array of sidewall-forming via-hole conductors that electrically connects the pair of sub-line part main conductor layers in the thickness direction. The main-line part comprises a dielectric layer thicker than the dielectric layer of the sub-line part, a pair of main-line part main conductor layers that oppose each other in the thickness direction with the dielectric layer interposed therebetween, and an array of sidewall-forming via-hole conductors that electrically connects the pair of main-line part main conductor layers in the thickness direction. The conversion part is composed of one layer of the pair of sub-line part main conductor layers and one layer of the pair of main-line part main conductor layers, and both layers are formed as one.

The second laminated waveguide shares at least one dielectric layer among the dielectric layers of the first laminated waveguide and comprises, a pair of main conductor layers that oppose each other in the thickness direction with a plurality of dielectric layers comprising the shared dielectric layer interposed therebetween, and an array of sidewall-forming via-hole conductors that electrically connects the pair of main conductor layers in the thickness direction. One layer of the pair of main conductor layers is disposed closer to one side in the thickness direction than the conversion part, and the other layer of the pair of main conductor layers is disposed closer to one side in the thickness direction than the other layer of the pair of sub-line part main conductor layers.

The common line part is provided between the first laminated waveguide and the second laminated waveguide, and comprises a pair of common line main conductor layers that oppose each other in the thickness direction with the dielectric layers of both the first laminated waveguide and the second laminated waveguide interposed therebetween and an array of sidewall-forming via-hole conductors that electrically connects the pair of common line main conductor layers in the thickness direction. One layer of the pair of common line main conductor layers is electrically connected to the conversion part, and the other layer of the pair of common line main conductor layers is electrically connected to the other layer of the pair of main conductor layers.

A circuit board, a high-frequency module, and a radar apparatus according to the invention comprise the above-described high-frequency transmission line connection structure.

A waveguide board according to an embodiment of the invention is a waveguide board comprising a waveguide, wherein the waveguide comprises one of an upper surface thereof and a lower surface thereof having a planar shape and the other surface having a stepped shape, the one surface is composed of a first conductor layer being disposed on the same plane, and the other surface is composed of a pair of second conductor layers being disposed on different planes and partly overlapping with each other in a plan view thereof and a via-conductor connecting the second conductor layers to each other in the overlap region.

BRIEF DESCRIPTION OF DRAWINGS

Other and further objects, features, and advantages of the invention are more explicit from the following detailed description taken with reference to the drawings wherein:

FIG. 8 is a schematic plan view showing a configuration of a transceiver TR according to an embodiment of the invention;

BEST MODE FOR CARRYING OUT THE INVENTION

Hereinafter, embodiments of the invention are described with reference to the accompanying drawings.

Figure 1:
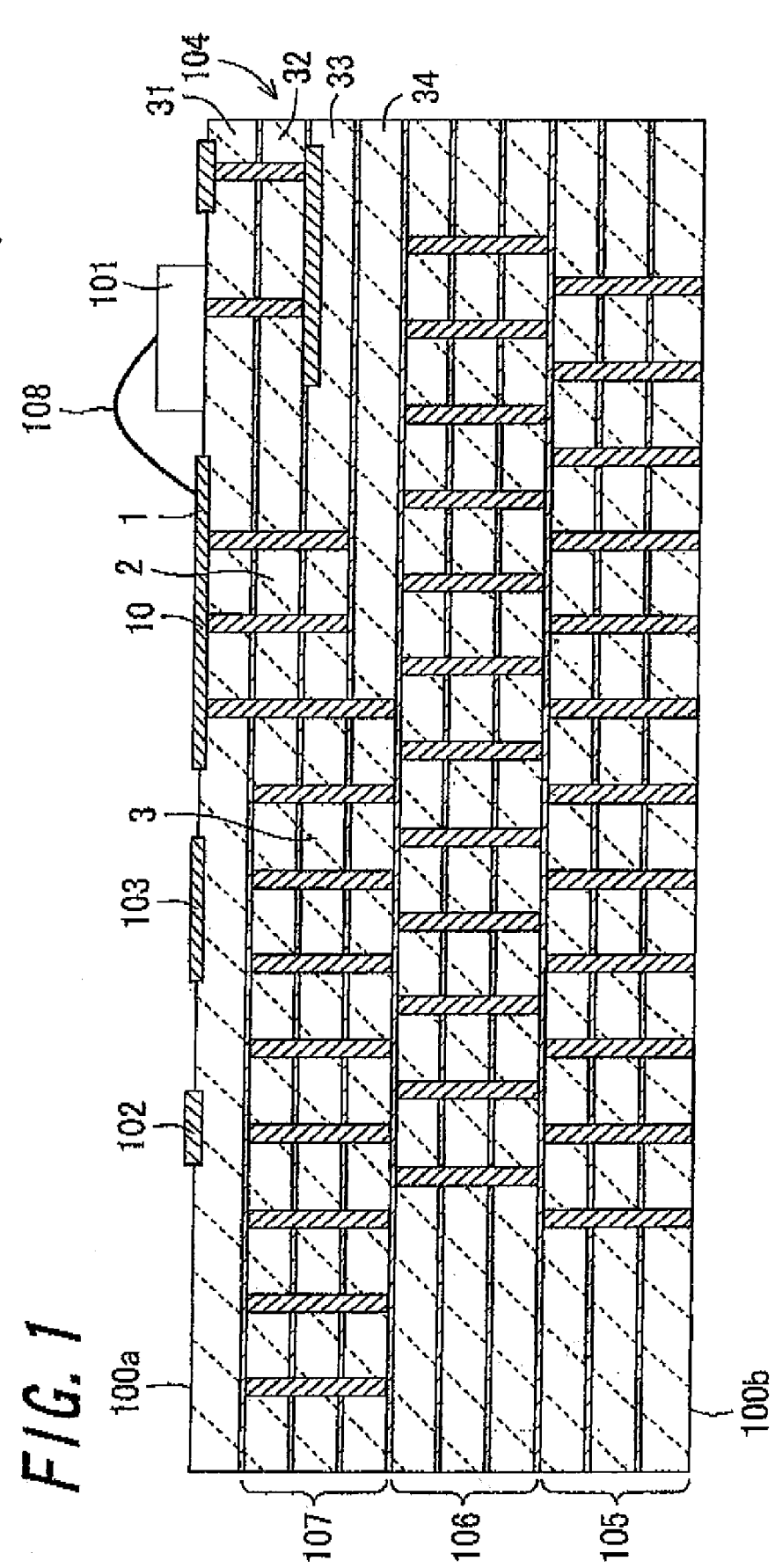
FIG. 1 is a schematic cross-sectional view showing a high-frequency module 100 including a high-frequency transmission line connection structure according to an embodiment of the invention.
Figure 2:
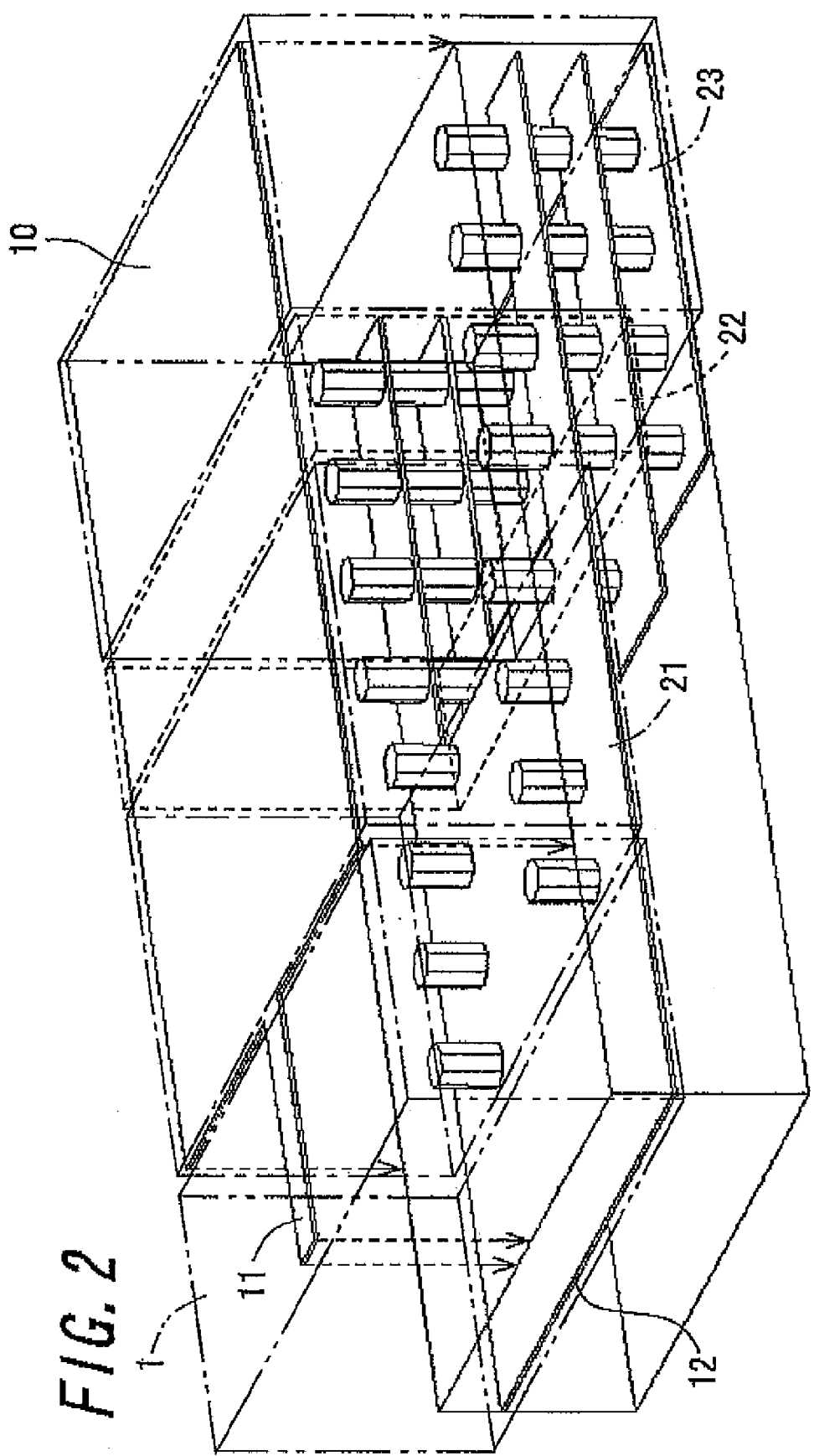
FIG. 2 is a schematic perspective view showing a connection portion between a microstrip line 1 and a first laminated waveguide 2 in the connection structure shown in FIG. 1.
Figure 3:
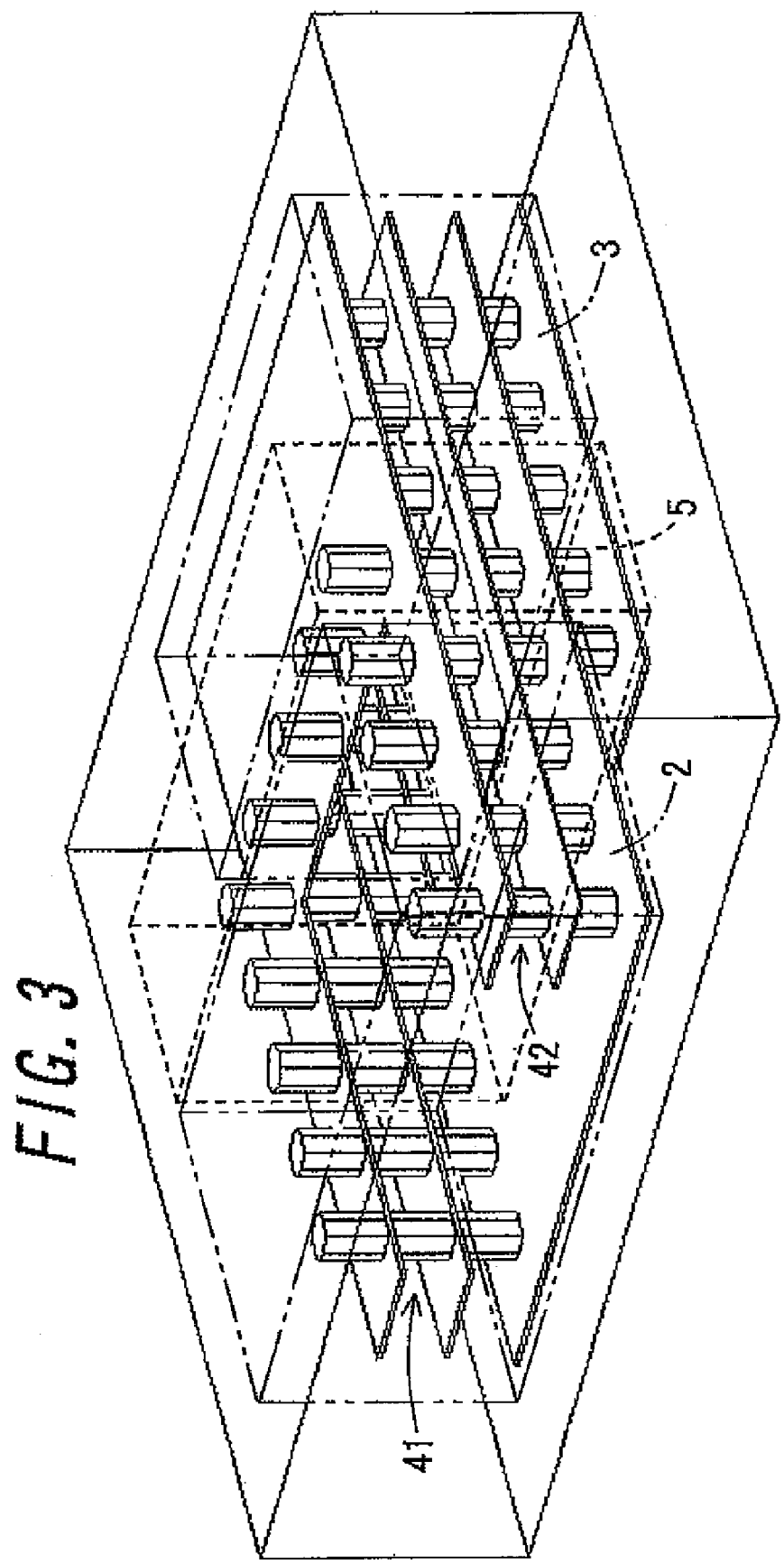
FIG. 3 is a schematic perspective view showing a connection portion between the first laminated waveguide 2 and a second laminated waveguide 3 in the connection structure shown in FIG. 1.
Figure 10:
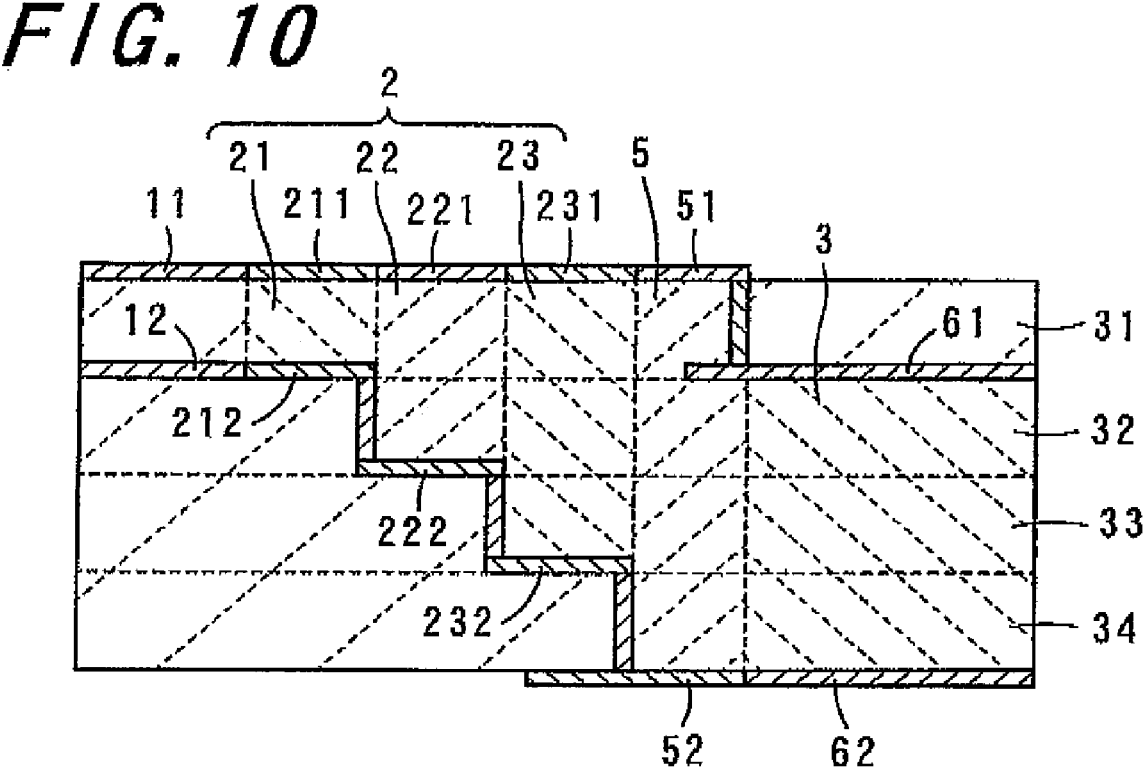
FIG. 10 is a schematic cross-sectional view showing the connection structure shown in FIG. 1.

FIG. 1 is a schematic cross-sectional view showing a high-frequency module 100 including a high-frequency transmission line connection structure according to an embodiment of the invention. FIG. 10 shows a schematic cross section of the connection structure shown in FIG. 1. FIG. 2 is a schematic perspective view showing a connection portion between a microstrip line 1 and a first laminated waveguide 2 in the connection structure shown in FIG. 1. FIG. 3 is a schematic perspective view showing a connection portion between the first laminated waveguide 2 and a second laminated waveguide 3 in the connection structure shown in FIG. 1. FIGS. 4A to 4E are plan views showing the connection structure shown in FIG. 1 exploded for each dielectric layer.

In FIGS. 2 and 3, illustrations of dielectric layers are omitted for the microstrip line 1, the first laminated waveguide 2, and the second laminated waveguide 3 so that an inner structure can be understood.

A high-frequency transmission line is a line for transmitting high-frequency signals in a microwave band or a millimeter wave band; and includes a high-frequency transmission line conductor and a laminated waveguide as in the invention. The high-frequency transmission line conductor includes a microstrip line, a strip line, a coplanar line, a bonding wire, and the like, and transmits high-frequency signals to a line conductor in the line for transmitting high-frequency signals. The laminated waveguide has a configuration, for example, such that a dielectric layer is surrounded by two conductor layers and a via-hole conductor array that electrically connects these two conductor layers to each other. Among the lines for transmitting high-frequency signals, the laminated waveguide is a line for transmitting high-frequency signals to a dielectric body (waveguide).

The laminated waveguide can be obtained, for example, by stacking a plurality of dielectric green sheets coated with a paste for conductor layers to form a multi-layer dielectric green sheet and firing the multi-layer dielectric green sheet at high temperature, and a thickness thereof can be easily controlled. Since a transmission loss decreases as the thickness of the laminated waveguide is increased up to a certain thickness, it is possible to easily obtain desired transmission characteristics by controlling the thickness.

As shown in FIG. 1, a high-frequency module 100 according to the invention includes one surface 100a in a thickness direction thereof, and the other surface 100b disposed on the opposite side of the one surface 100a. On an approximately entire surface of the one surface 100a, a microstrip line 1, an MMIC (monolithic microwave integrated circuit) 101 which is a high-frequency circuit device electrically connected to the microstrip line 1, MMIC bias lines 102, high-frequency signal lines 103, and the like are arranged. An approximately entire surface of the other surface 100b is configured as an antenna surface.

Therefore, in a circuit board 104 that constitutes the high-frequency module 100, an antenna layer 105 including the other surface 100b, which is the antenna surface, a first feed layer 106, and a second feed layer 107 are laminated in that order.

The MMIC 101 and the microstrip line 1 are connected by a bonding wire 108. High-frequency signals outputted from the MMIC 101 are transmitted through the bonding wire 108, which are then transmitted from a wire connection portion of the microstrip line 1 along the one surface 100a through the strip conductor and transmitted through the first laminated waveguide 2 in a thickness direction of the circuit board 104 via a conversion part 10.

In the embodiment shown in FIGS. 2, 3, 4A to 4E, and 10, a plurality of dielectric layers 31, 32, 33, and 34 is laminated in that order from the side of the one surface 100a. The plurality of dielectric layers includes the microstrip line 1 which is formed on the dielectric layer 31 including the one surface 100a among the dielectric layers, the first laminated waveguide 2 which is formed to include a plurality of upper dielectric layers (the dielectric layers 31, 32, and 33 in the embodiment) and connected to the microstrip line 1 via the conversion part 10, and the second laminated waveguide 3 which is formed to include a plurality of lower dielectric layers (the dielectric layers 32, 33, and 34 in the embodiment) including a part of the upper dielectric layers (the dielectric layers 32 and 33 in the embodiment) and has a conversion part for performing conversion with respect to the first laminated waveguide 2.

The microstrip line 1 includes a strip conductor 11 and a ground (earth) conductor 12 which oppose each other in the thickness direction with the dielectric layer 31 interposed therebetween.

In the microstrip line 1, although the dielectric layer may include a plurality of layers interposed between the strip conductor 11 and the ground conductor 12, only one layer is used as the dielectric layer 31 in the embodiment shown in FIGS. 2, 3, 4A to 4E, and 10.

A connection portion between the microstrip line 1 and the first laminated waveguide 2 is described in detail with reference to FIGS. 2, 4A to 4E, and 10.

The first laminated waveguide 2 includes a first laminated waveguide sub-line part 21 which is connected to the microstrip line 1 and includes the dielectric layer 31, a second laminated waveguide sub-line part 22 which is connected to the first laminated waveguide sub-line part 21 and includes the dielectric layer 32, and a laminated waveguide main-line part 23 which is connected to the second laminated waveguide sub-line part 22 and includes the dielectric layer 33.

Although a detailed configuration of these line parts is described later, the line parts are provided in a stepped shape such that end portions of each line part are apart from each other by predetermined distances in a direction away from the microstrip line 1.

Moreover, the first laminated waveguide 2 has a configuration such that the thickness of the dielectric layer is different for each of the line parts. Specifically, the thickness of the dielectric layer increases gradually with the distance from the microstrip line 1. That is to say, the thickness of a dielectric layer interposed between a pair of main conductor layers of the first laminated waveguide sub-line part 21 is the smallest, and the thickness of a dielectric layer interposed between a pair of main conductor layers of the laminated waveguide main-line part 23 is the greatest.

The first laminated waveguide 2 can be obtained, for example, by stacking a plurality of multi-layer dielectric green sheets and firing the multi-layer dielectric green sheets at high temperature, and the thickness of the dielectric layer can be easily controlled by adjusting the thickness of the green sheet.

The first laminated waveguide sub-line part 21 includes a pair of main conductor layers composed of an upper main conductor layer 211 and a lower main conductor layer 212 which are electrically connected to the strip conductor 11 and the ground conductor 12 of the microstrip line 1, respectively, and oppose each other in the thickness direction with the dielectric layer 31 interposed therebetween.

The second laminated waveguide sub-line part 22 includes a pair of main conductor layers composed of an upper main conductor layer 221 and a lower main conductor layer 222 which oppose each other in the thickness direction at a distance larger than a distance in the thickness direction between the pair of main conductor layers of the first laminated waveguide sub-line part 21 with a dielectric layer interposed therebetween, the dielectric layer is composed of the dielectric layers 31 and 32 and thicker than the dielectric layer 31 of the first laminated waveguide sub-line part 21.

The laminated waveguide main-line part 23 includes a pair of main conductor layers composed of an upper main conductor layer 231 and a lower main conductor layer 232 which oppose each other in the thickness, direction at a distance larger than a distance in the thickness direction of the pair of main conductor layers of the second laminated waveguide sub-line part 22 with a dielectric layer interposed therebetween, which dielectric layer is composed of the dielectric layers 31, 32, and 33 and thicker than the dielectric layers 31 and 32 of the second laminated waveguide sub-line part 22.

The first laminated waveguide sub-line part 21, the second laminated waveguide sub-line part 22, and the laminated waveguide main-line part 23 have their respective pairs of main conductor layers which are electrically connected by a via-hole conductor. The via-hole conductor includes two rows of sidewall-forming via-hole conductor arrays 41 and 42 which are arranged in a signal transmission direction at a distance of less than ½ of the wavelength of signals to be transmitted.

The two rows of sidewall-forming via-hole conductor arrays 41 and 42 formed as above form electrical sidewalls of the laminated waveguide, and a waveguide is constructed by the sidewalls and the pair of main conductor layers.

The pair of main conductor layers are formed to have the same width in the signal transmission direction, and this width is larger than the distance between the rows of the sidewall-forming via-hole conductor arrays 41 and 42.

Since the respective line parts have such a configuration, a TE wave (Transverse Electric Wave) for which electric field components are transverse to an incident plane or a TM wave (Transverse Magnetic Wave) for which magnetic field components are transverse to an incident plane propagates through the waveguide.

Figure 5A:
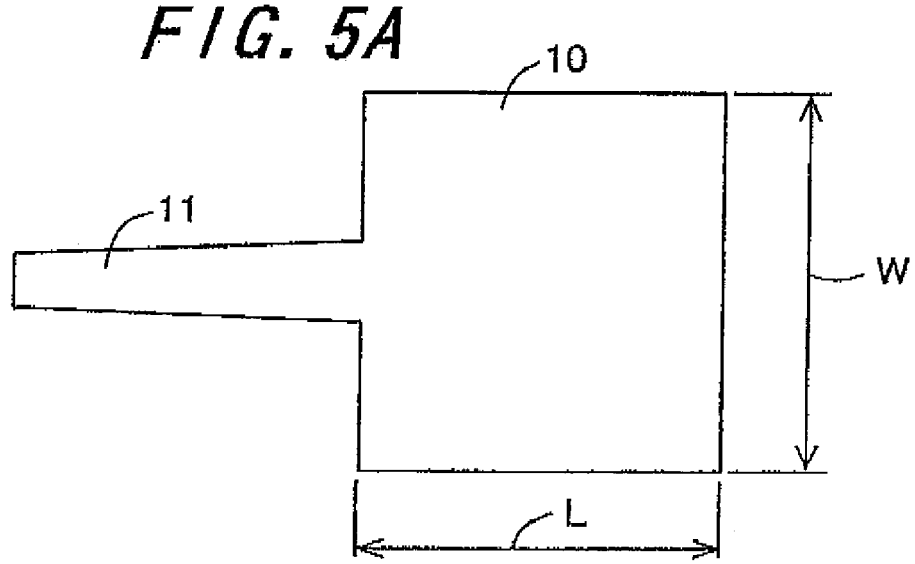
FIG. 5A is a diagram for explaining a configuration of a conversion part 10.
Figure 5B:
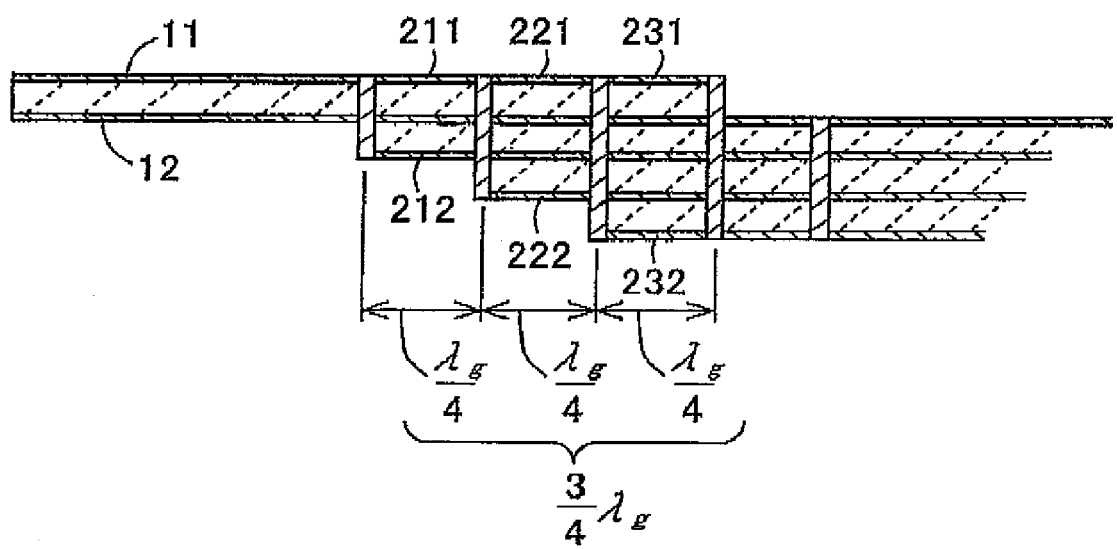
FIG. 5B is a diagram for explaining a configuration of the conversion part 10.

FIGS. 5A and 5B are diagrams for explaining a configuration of the conversion part 10. FIG. 5A is a plan view of the conversion part 10, and FIG. 5B is a cross-sectional view of a connection portion between the microstrip line 1 and the first laminated waveguide 2.

The conversion part 10 constitutes the connection portion between the microstrip line 1 and the first laminated waveguide 2 and is provided on the one surface 100a. The conversion part 10 is constituted by the upper main conductor layers 211, 221, and 231 which are provided on the one surface 100a among the respective main conductor layers of the first laminated waveguide sub-line part 21, the second laminated waveguide sub-line part 22, and the laminated waveguide main-line part 23. These upper main conductor layers 211, 221 and 231 are formed as one.

A width dimension W in the signal transmission direction of the conversion part 10 is the same as a width dimension of the main conductor layer and may be set appropriately based on the frequency of transmission signals or the like. Moreover, the width dimension is set in view of a cut-off frequency of high-frequency signals to be transmitted. For example, when the frequency of transmission signals is 76.5 GHz, W=1.15 mm and the cut-off frequency is set to about 43 GHz.

Moreover, the end portions in the signal transmission direction of the lower main conductor layers 212, 222, and 232 are disposed to be apart from each other in the signal transmission direction by ¼ of the wavelength λ of transmission signals. A length dimension L of the conversion part 10 in the length direction parallel to the signal transmission direction is set to 3λ/4 so as to cover the lower main conductor layers 212, 222, and 232 in a plan view thereof. For example, L=0.9 mm when the frequency of transmission signals is 70 to 85 GHz.

The width dimension W and the length dimension L of the conversion part 10 are minimum dimensions necessary for a conversion part. The conversion part 10 may be formed so that the width dimension increases towards both sides thereof, and the length dimension increases towards a side opposite to a connection portion with the strip conductor 11.

In the sidewall-forming via-hole conductor arrays 41 and 42, a distance between adjacent via-hole conductors is set to be smaller than ½ of the wavelength λ (λ/2) of signals to be transmitted. By doing so, electromagnetic waves become less likely to leak through a gap between the via-hole conductor and the via-hole conductor and are propagated in the signal transmission direction of the laminated waveguide while reflecting from the via-hole conductors.

Although the via-hole conductors constituting the sidewall-forming via-hole conductor arrays 41 and 42 are preferably provided, such that a distance between adjacent via-hole conductors is constant, the distance may be at least smaller than ½ of the wavelength λ of signals to be transmitted and can be appropriately set to be within such a range.

Moreover, by providing an additional sidewall-forming via-hole conductor array on an outside of the two rows of sidewall-forming via-hole conductor arrays 41 and 42 that form the laminated waveguide 2 and thus forming double or triple pseudo-sidewalls formed by the sidewall-forming via-hole conductor array in the width direction with respect to the transmission direction, it is possible to reduce the leakage of electromagnetic waves more effectively.

When the dielectric layer is composed of a plurality of layers, it is preferable to provide a sub conductor layer between the dielectric layers in parallel to the main conductor layer. The sub conductor layer is a strip-like conductor layer that electrically connects the respective via-hole conductors belonging to the same row and passing through the same dielectric layer in a surface direction and extends in an arrangement direction of the via-hole conductors.

These sub conductor layers correspond to the conductor layers 53, 54, and 55 in FIGS. 4A to 4E, and by the via-hole conductor arrays and the sub conductor layers, it is possible to obtain sidewalls which are formed into a lattice form and to lower the leakage of electromagnetic waves in various directions. Moreover, the sub conductor layers function as a large land of the via-hole conductors, and it is possible to lower connection faults in the thickness direction of the via-hole conductors resulting from stacking errors. When connection faults in the thickness direction of the via-hole conductors occur, a leakage of electromagnetic waves is likely to occur at locations of the connection faults, and thus a transmission loss increases. However, it is possible to lower this by providing the sub conductor layers.

Next, the connection portion between the first laminated waveguide 2 and the second laminated waveguide 3 is described in detail with reference to FIGS. 3, 4A to 4E, and 10.

The connection portion between the first laminated waveguide 2 and the second laminated waveguide 3 has a laminated structure of the dielectric layers 31, 32, 33, and 34.

As described above, the first laminated waveguide 2 includes a pair of main conductor layers composed of the upper main conductor layers 211, 221, and 231 and the lower main conductor layers 212, 222, and 232 which oppose each other in the thickness direction with a plurality of dielectric layers 31, 32, and 33 interposed therebetween, and two rows of sidewall-forming via-hole conductor arrays 41 and 42 in which the via-hole conductors electrically connecting this pair of main conductor layers to each other are arranged in the signal transmission direction at a distance of less than ½ of the signal wavelength.

The second laminated waveguide 3 shares at least one dielectric layer as its dielectric layer among the plurality of dielectric layers 31, 32, and 33 interposed between the pair of main conductor layers of the first laminated waveguide 2. In the embodiment, the shared dielectric layer is composed of the two dielectric layers 32 and 33.

The second laminated waveguide 3 includes a pair of main conductor layers composed of an upper main conductor layer 61 and a lower main conductor layer 62 which oppose each other in the thickness direction with a plurality of dielectric layers 32, 33, and 34 including the shared dielectric layers 32 and 33 interposed therebetween. Moreover, the laminated waveguide 3 includes two rows of sidewall-forming via-hole conductor arrays 41 and 42 in which the via-hole conductors electrically connecting this pair of main conductor layers to each other are arranged in the signal transmission direction at a distance of less than ½ of the signal wavelength.

Here, the second laminated waveguide 3 is disposed with respect to the first laminated waveguide 2 in the following manner.

The upper main conductor layer 61 of the second laminated waveguide 3 is disposed below the upper main conductor layers 211, 221, and 231 which are the uppermost of the first laminated waveguide 2, that is to say disposed below the conversion part 10, and is formed on the same plane as the lower main conductor layer 212 of the first laminated waveguide sub-line part 21. The lower main conductor layer 62 of the second laminated waveguide 3 is disposed below the lower main conductor layer 232 which is the lowermost of the first laminated waveguide 2.

In other words, the second laminated waveguide 3 is provided at a position which is apart by one dielectric layer from the first laminated waveguide 2 in the thickness direction (the direction of an electric field of the electromagnetic waves propagating through the laminated waveguides 2 and 3). Although a three-layer structure is illustrated as the plurality of dielectric layers in the figures, the number of layers is not particularly limited.

Moreover, a common line part 5 is provided between the first laminated waveguide 2 and the second laminated waveguide 3. Similar to the first laminated waveguide 2 and the second laminated waveguide 3, the common line part 5 includes a pair of main conductor layers (an upper main conductor layer 51 and a lower main conductor layer 52) and two rows of sidewall-forming via-hole conductor arrays 41 and 42 in which the via-hole conductors electrically connecting this pair of main conductor layers to each other are arranged in the signal transmission direction at a distance of less than ½ of the signal wavelength.

The upper main conductor layer 51 is formed by integrating with the upper main conductor layer 231 on the same plane as the upper main conductor layer 231 of the first laminated waveguide 2. The lower main conductor layer 52 is formed by integrating with the lower main conductor layer 62 on the same plane as the lower main conductor layer 62 of the second laminated waveguide 3.

In this structure, a length in the signal transmission direction of the common line part 5 is preferably set to about 0.15 mm to 0.40 mm in order to obtain good reflection characteristics.

The two rows of sidewall-forming via-hole conductor arrays 41 and 42 which are formed over the first laminated waveguide 2, the common line part 5, and the second laminated waveguide 3 are arranged in the signal transmission direction at a distance of less than ½ of the wavelength of signals to be transmitted.

Moreover, similar to the first laminated waveguide 2, in the second laminated waveguide 3 and the common line part 5, by providing an additional sidewall-forming via-hole conductor array on an outside of the sidewall-forming via-hole conductor arrays 41 and 42 and thus forming double or triple sidewalls in the width direction with respect to the transmission direction, it is possible to lower the leakage of electromagnetic waves more effectively.

Furthermore, similar to the first laminated waveguide 2, in the second laminated waveguide 3 and the common line part 5, when the dielectric layer is composed of a plurality of layers, it is preferable to provide a sub conductor layer.

Each dielectric layer is described in detail with reference to FIGS. 4A to 4E. FIGS. 4A to 4D are plan views showing the dielectric layers 31, 32, 33, and 34 exploded for each layer, as viewed from the side of the one surface 100*a*. FIG. 4E is a plan view of the dielectric layer 34, as viewed from the side of the other surface 100*b*.

Figure 4A:
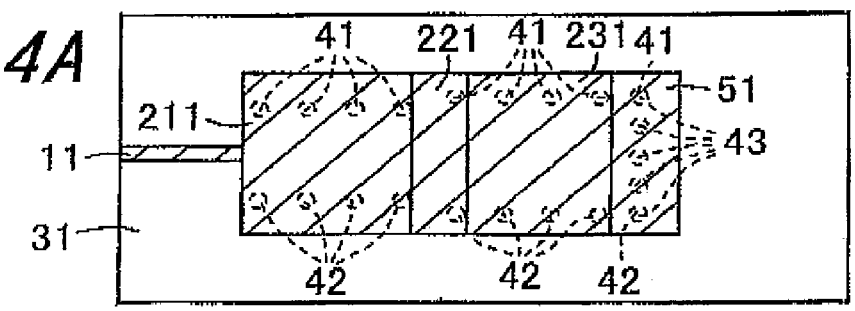
FIG. 4A is a plan view showing the connection structure shown in FIG. 1 exploded for each dielectric layer.

As shown in FIG. 4A, on the surface of the dielectric layer 31, the strip conductor 11 and the upper main conductor layers 211, 221, and 231 (the conversion part 10) which are connected to the strip conductor 11 and constitute the first laminated waveguide 2 are formed. The upper main conductor layer 51 of the common line part 5 is formed with one end thereof connected to an end portion of the upper main conductor layer 231 of the first laminated waveguide 2. Moreover, the two rows of sidewall-forming via-hole conductor arrays 41 and 42 are formed inside the dielectric layer 31.

Furthermore, a portion in the vicinity of the other end of the common line part 5 overlaps with an end portion of the second laminated waveguide 3 as viewed from the above. In FIG. 4A, an array of boundary wall-forming via-hole conductors 43 composed of five via-hole conductors that electrically connect the portion in the vicinity of the other end of the upper main conductor layer 51 of the common line part 5 and the end portion of the upper main conductor layer 61 of the second laminated waveguide 3 to each other is arranged inside the dielectric layer 31 in a direction perpendicular to the signal transmission direction at a distance of less than ½ of the transmission signal wavelength λ, whereby a leakage of high-frequency signals from this boundary is lowered. Here, the two via-hole conductors at both ends of the boundary wall-forming via-hole conductor array 43 are shared by the sidewall-forming via-hole conductor arrays 41 and 42, respectively.

Figure 4B:
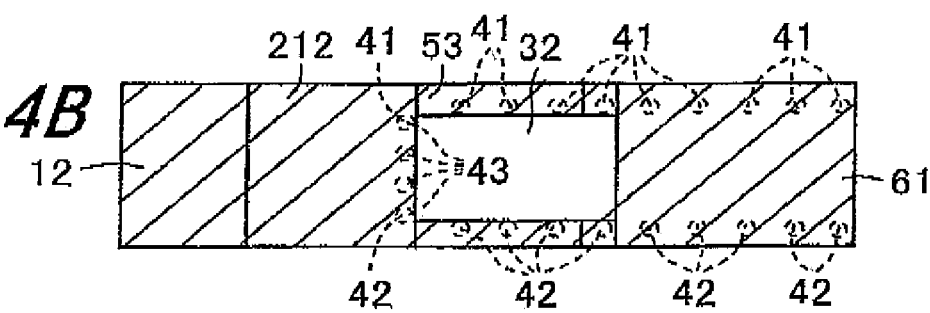
FIG. 4B is a plan view showing the connection structure shown in FIG. 1 exploded for each dielectric layer.

As shown in FIG. 4B, on the surface of the dielectric layer 32, the ground conductor 12 constituting the microstrip line 1, the lower main conductor layer 212 constituting the first laminated waveguide 2, the sub conductor layer 53, and the upper main conductor layer 61 constituting the second laminated waveguide 3 are formed as one. Moreover, the two rows of sidewall-forming via-hole conductor arrays 41 and 42 are formed inside the dielectric layer 32. The sidewall-forming via-hole conductor arrays 41 and 42 each are composed of eight via-hole conductors which extend from the first laminated waveguide 2 to the second laminated waveguide 3.

Figure 4C:
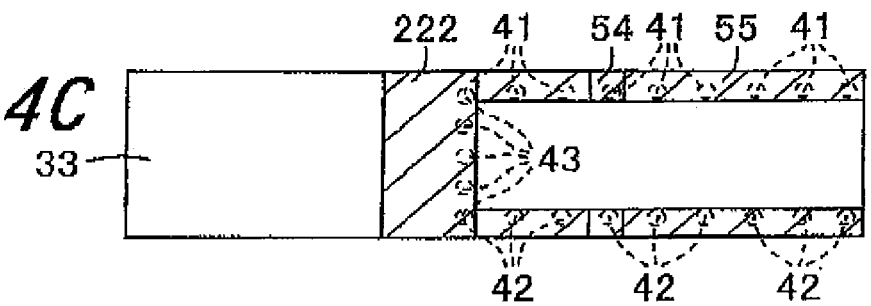
FIG. 4C is a plan view showing the connection structure shown in FIG. 1 exploded for each dielectric layer.

As shown in FIG. 4C, on the surface of the dielectric layer 33, the lower main conductor layer 222 constituting the first laminated waveguide 2, the sub conductor layer 54, and the sub conductor layer 55 constituting the second laminated waveguide 3 are formed as one to be electrically connected to each other. Moreover, the two rows of sidewall-forming via-hole conductor arrays 41 and 42 are formed inside the dielectric layer 33. The sidewall-forming via-hole conductor arrays 41 and 42 each are composed of eight via-hole conductors which extend from the first laminated waveguide 2 to the second laminated waveguide 3.

Figure 4D:
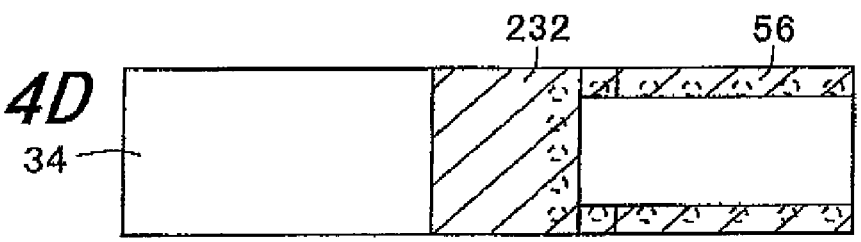
FIG. 4D is a plan view showing the connection structure shown in FIG. 1 exploded for each dielectric layer.
Figure 4E:
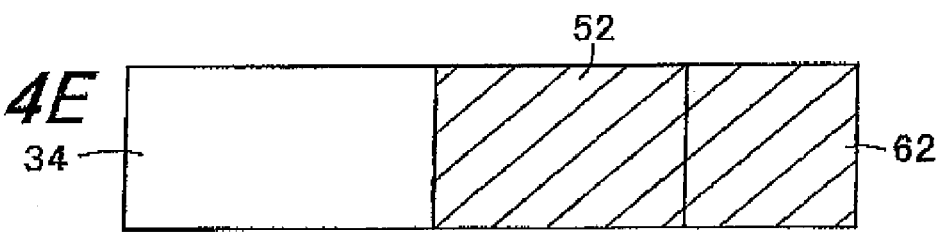
FIG. 4E is a plan view showing the connection structure shown in FIG. 1 exploded for each dielectric layer.

As shown in FIG. 4D, on the surface of the dielectric layer 34, the lower main conductor layer 232 constituting the first laminated waveguide 2 and the sub conductor layer 56 constituting the second laminated waveguide 3 are formed. Moreover, the two rows of sidewall-forming via-hole conductor arrays 41 and 42 are formed inside the dielectric layer 34. The sidewall-forming via-hole conductor arrays 41 and 42 formed inside the dielectric layer 34 each are composed of five via-hole conductors which extend from the common line part 5 to the second laminated waveguide 3.

Furthermore, an end portion of the first laminated waveguide 2 overlaps with a portion in the vicinity of one end of the common line part 5 as viewed from the above. An array of boundary wall-forming via-hole conductors composed of via-hole conductors that electrically connects an end portion of the lower main conductor layer 232 of the first laminated waveguide 2 and the lower main conductor layer 52 of the common line part 5 to each other is arranged in a direction perpendicular to the signal transmission direction at a distance of less than ½ of the signal wavelength λ, thus forming a boundary wall so as to reduce a leakage of high-frequency signals through this boundary. Here, the two via-hole conductors at both ends of the arrangement of the via-hole conductor array are shared by the sidewall-forming via-hole conductor arrays 41 and 42, respectively.

As shown in FIG. 4E, on a back surface of the dielectric layer 34, the lower main conductor layer 62 constituting the second laminated waveguide 3 is formed. Although not shown in FIG. 4E, the boundary wall-forming via-hole conductor array 43 shown in FIG. 4D is connected to a portion in the vicinity of one end of the lower main conductor layer 52 constituting the common line part 5. Moreover, the sidewall-forming via-hole conductor arrays 41 and 42 shown in FIG. 4D are connected to the lower main conductor layer 62 constituting the second laminated waveguide 3.

As described above, the first laminated waveguide 2 is configured such that the thickness of the dielectric layer of each line part increases gradually from the first laminated waveguide sub-line part 21 to the laminated waveguide main-line part 23. Specifically, the first laminated waveguide sub-line part 21 includes the dielectric layer 31 and a pair of main conductor layers interposing this layer therebetween. The second laminated waveguide sub-line part 22 includes the dielectric layers 31 and 32 and a pair of main conductor layers interposing these layers therebetween. The laminated waveguide main-line part 23 includes the dielectric layers 31, 32, and 33 and a pair of main conductor layers interposing these layers therebetween.

In this way, by increasing the thickness of the dielectric layer constituting the waveguide in the signal transmission direction, it becomes easy to match and design the characteristic impedance between the microstrip line 1 and the laminated waveguide main-line part 23 of the first laminated waveguide 2. Therefore, there is small characteristic variations even when manufacturing defects such as so-called stacking errors occur, and it is possible to match the characteristic impedance so that a conversion loss is reduced.

When an adjustment is achieved by changing only the distance between the via-hole conductor array 41 and the via-hole conductor array 42, which is a waveguide width, the wavelength of high-frequency signals being transmitted through the first laminated waveguide 2 is changed with the changed width. As a result, it becomes difficult to achieve an adjustment for matching the characteristic impedance.

To the contrary, according to the invention, since an adjustment is achieved by changing the thickness of the dielectric layer, the wavelength does not change inside the first laminated waveguide 2. Moreover, the frequency band of the conversion part 10 is as wide as 10 GHz or more. Due to this, it is easy to achieve an adjustment for matching the characteristic impedance, and the degree of freedom in the characteristic impedance matching and the stability against variations can be improved.

Moreover, in the second laminated waveguide, by disposing one layer of the pair of main conductor layers on one side in the thickness direction from the conversion part, namely on an inner side, it is possible to provide the main conductor layer in the inner layer without disposing it on the surface. Therefore, in a circuit board having the connection structure, it is possible to mount more circuit elements such as other line conductors or high-frequency circuit devices on the surface of the board. Thus, it is possible to configure a high-frequency circuit with a small size and more sophisticated functions.

In the embodiment, the strip conductor 11, the upper main conductor layer 211 constituting the first laminated waveguide sub-line part 21, the upper main conductor layer 221 constituting the second laminated waveguide sub-line part 22, and the upper main conductor layer 231 constituting the laminated waveguide main-line part 23 are formed on the same plane and have respective end portions which are directly electrically connected to each other. Moreover, the ground conductor 12, the lower main conductor layer 212 constituting the first laminated waveguide sub-line part 21, the lower main conductor layer 222 constituting the second laminated waveguide sub-line part 22, and the lower main conductor layer 232 constituting the laminated waveguide main-line part 23 have respective end portions which are electrically connected to each other in the thickness direction by the array of boundary wall-forming via-hole conductors in which via-hole conductors are arranged at a distance of less than ½ of the signal wavelength. However, the invention is not limited to such constitution, and the respective upper main conductor layers may be electrically connected to each other in the thickness direction by the array of boundary wall-forming via-hole conductors, and the respective lower main conductor layers may be formed on the same plane and be directly electrically connected to each other. Alternatively, the respective upper main conductor layers and the respective lower main conductor layers may be electrically connected to each other in the thickness direction by corresponding boundary wall-forming via-hole conductor arrays, respectively.

Moreover, as shown in FIGS. 2 and 4A to 4E, in the embodiment, the distance between the via-hole conductor array 41 and the via-hole conductor array 42 may be set to be the same as the distance between the second laminated waveguide sub-line part 22 and the laminated waveguide main-line part 23, and the distance between the via-hole conductor array 41 and the via-hole conductor array 42 in the first laminated waveguide sub-line part 21 may be set to be smaller than the distance between the second laminated waveguide sub-line part 22 and the laminated waveguide main-line part 23. Thereby, since the electric field distribution of the laminated waveguide 2 in the first laminated waveguide sub-line part 21 can be made to be closer to the electric field distribution of the microstrip line 1, it is possible to obtain an advantage of reducing the leakage of electromagnetic waves associated with a mode conversion and increasing a coupling amount.

Furthermore, the distance between the via-hole conductor array 41 and the via-hole conductor array 42 may be gradually increased from the first laminated waveguide sub-line part 21 to the laminated waveguide main-line part 23. Specifically, the distance in the second laminated waveguide sub-line part 22 may be set to be larger than the distance in the first laminated waveguide sub-line part 21, and the distance in the laminated waveguide main-line part 23 may be set to be larger than the distance in the second laminated waveguide sub-line part 22.

In the invention, the line parts may be composed only of the first laminated waveguide sub-line part 21 including a pair of main conductor layers which have a small distance in the thickness direction and are connected to the strip conductor 11 and the ground conductor 12, respectively, and the laminated waveguide main-line part 23 including a pair of main conductor layers which have a larger distance in the thickness direction than the first laminated waveguide sub-line part 21. For example, the line parts may not have the above-described second laminated waveguide sub-line part 22, in which the pair of main conductor layers (the upper main conductor layer 211 and the lower main conductor layer 212) of the first laminated waveguide sub-line part 21 oppose each other in the thickness direction with one dielectric layer interposed therebetween, and the pair of main conductor layers (the upper main conductor layer 231 and the lower main conductor layer 232) of the laminated waveguide main-line part 23 oppose each other in the thickness direction with two dielectric layers interposed therebetween.

From the viewpoint of good adjustment of the characteristic impedance, it is preferable that a change in the distance in the thickness direction of the pair of main conductor layers in the respective line parts adjacent to each other in the signal transmission direction, namely a change in the thickness of the dielectric layers is small.

Furthermore, when the laminated waveguide main-line part 23 includes more dielectric layers, n laminated waveguide sub-line parts (where n is an integer of 2 or more) (first laminated waveguide sub-line part, second laminated waveguide sub-line part, . . . , and n-th laminated waveguide sub-line part), in which the distance of the pairs of main conductor layers are different, may be provided between the microstrip line 1 and the laminated waveguide main-line part 23. Thereby, it is possible to achieve a fine adjustment of the characteristic impedance matching and to further improve the degree of freedom in adjustment. In this case, since it is difficult to achieve an adjustment of the impedance matching when there are too many laminated waveguide sub-line parts, it is preferable that n is equal to or smaller than 10. In addition, it is preferable that the thickness of the dielectric layer forming the laminated waveguide main-line part 23 is in a range of not more than the width of the main conductor layer.

The circuit board having the above-described connection structure is not particularly limited as long as it has such characteristics that do not disturb the transmission of high-frequency signals, and the circuit board is preferably formed of ceramics from the viewpoint of accuracy in forming transmission lines and easiness of the production.

A circuit board formed of glass ceramics is produced in the following manner, for example. An appropriate organic solvent is added to and mixed with powder of a ceramics raw material such as glass ceramics, alumina ceramics, or aluminum nitride ceramics, made into a slurry form. The mixture is formed into a sheet-like form by using a well-known technique such as the doctor blade method or the calender roll method, to obtain a plurality of ceramic green sheets. Thereafter, these ceramic green sheets are subjected to an appropriate punching process while filling a conductor paste into via-holes, and a layer having circuit patterns and beta patterns printed thereon is laminated thereon. Then, firing is conducted at 850 to 1,000° C. in the case of glass ceramics at high temperature of 1,500 to 1,700° C. in the case of alumina ceramics, or at 1,600 to 1,900° C. in the case of aluminum nitride ceramics.

The strip conductor, the ground conductor, and the pair of main conductor layers are formed in the following manner. When the dielectric layer is made from alumina ceramics, for example, a conductor paste in which an oxide such as alumina, silica or magnesia, an organic solvent and the like are appropriately added to and mixed with powder of a metal such as tungsten or molybdenum, is printed onto the ceramic green sheets by a thick-film printing technique. Thereafter, the ceramic green sheets are co-fired at high temperature of about 1,600° C. so that the strip conductor, the ground conductor, and the pair of main conductor layers have a thickness of at least 10 to 15 µm. As the metal powder, copper, gold or silver is preferably used in the case of glass ceramics, and tungsten or molybdenum is preferably used in the case of alumina ceramics or aluminum nitride ceramics. Moreover, the thickness of the main conductor layers is typically set to be about 5 to 50 µm.

Although the dielectric layer of the circuit board is preferably formed from ceramics as described above, a resin material may be used from the viewpoint of transmission characteristics or manufacturing costs. As a resin material usable as the dielectric layer, PTET, liquid-crystal polymer, FR4, fluorine resin, or fluorine glass resin can be exemplified, for example.

Next, a high-frequency module according to another embodiment of the invention is described in detail with reference to the drawings.

Figure 6A:
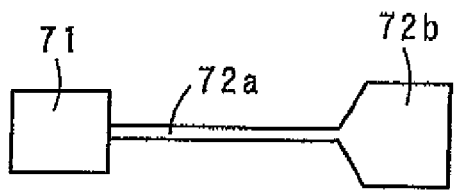
FIG. 6A is a schematic view showing a configuration of a transmitter T according to an embodiment of the invention.
Figure 6B:
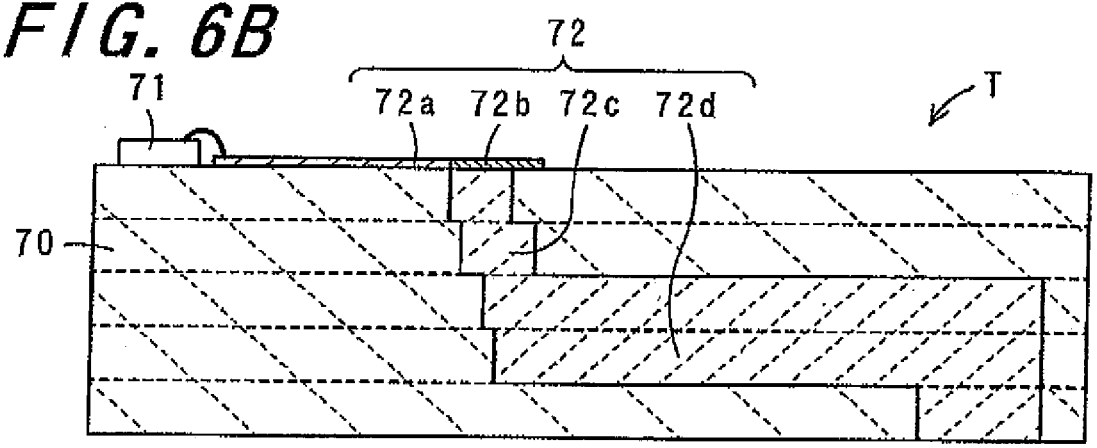
FIG. 6B is a schematic view showing a configuration of the transmitter T according to an embodiment of the invention.
Figure 6C:
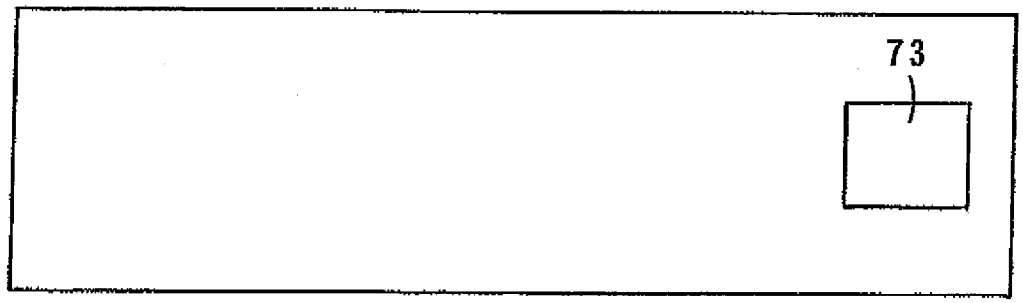
FIG. 6C is a schematic view showing a configuration of the transmitter T according to an embodiment of the invention.
Figure 7A:
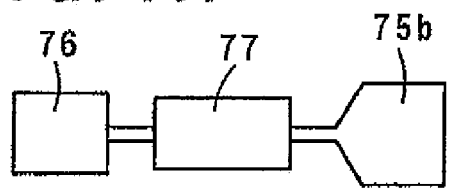
FIG. 7A is a schematic view showing a configuration of a receiver R according to an embodiment of the invention.
Figure 7B:
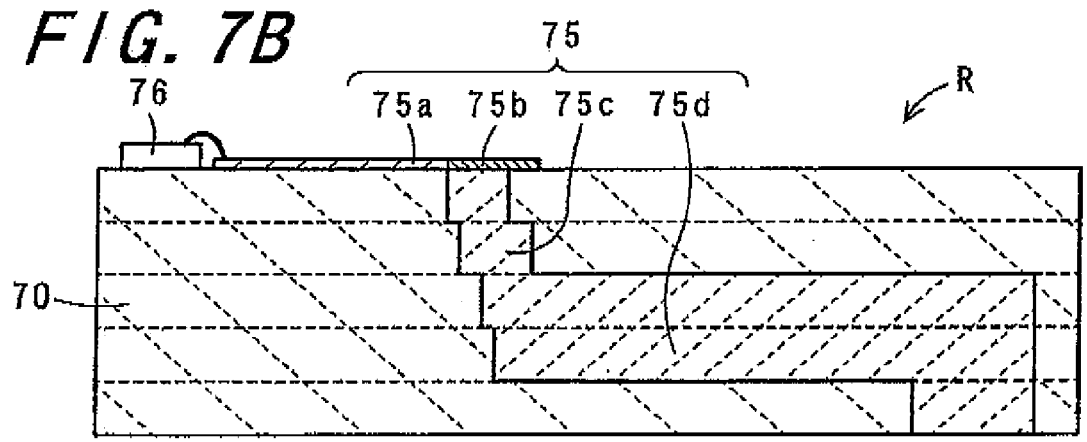
FIG. 7B is a schematic view showing a configuration of the receiver R according to an embodiment of the invention.
Figure 7C:
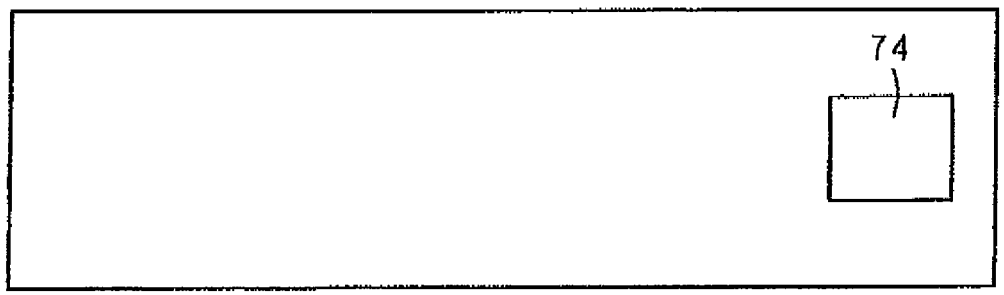
FIG. 7C is a schematic view showing a configuration of the receiver R according to an embodiment of the invention.
Figure 9:
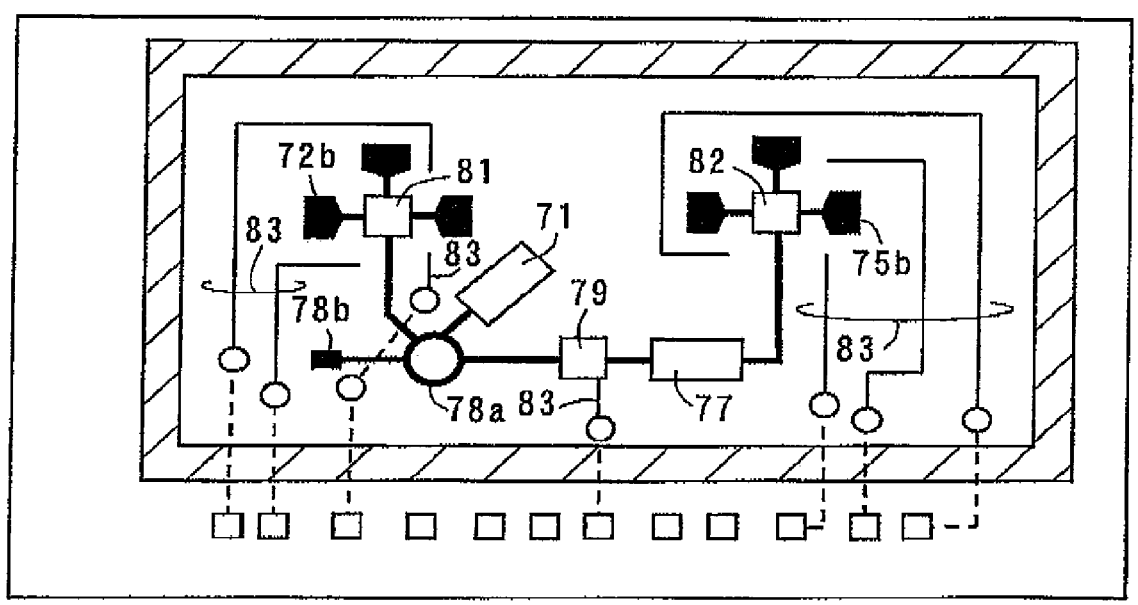
FIG. 9 is a schematic plan view showing a configuration of a transceiver TR2 according to an embodiment of the invention.

FIGS. 6A to 6C are schematic views showing a configuration of a transmitter T according to an embodiment of the invention, in which FIG. 6A is a plan view on the one surface side, FIG. 6B is a cross-sectional view, and FIG. 6C is a plan view on the other surface side. FIGS. 7A to 7C are schematic views showing a configuration of a receiver R according to an embodiment of the invention, in which FIG. 7A is a plan view on the one surface side, FIG. 7B is a cross-sectional view, and FIG. 7C is a plan view on the other surface side. FIG. 8 is a schematic plan view showing a configuration of a transceiver TR according to an embodiment of the invention. FIG. 9 is a schematic plan view showing a configuration of a transceiver TR2 according to an embodiment of the invention.

The transmitter T shown in FIGS. 6A to 6C includes a high-frequency oscillator 71 configured to generate high-frequency signals, a high-frequency transmission line 72 configured to transmit the high-frequency signals from the high-frequency oscillator 71, and having one end connected to the high-frequency oscillator 71, and a transmitting antenna 73 configured to radiate high-frequency signals therefrom, and connected to the other end of the high-frequency transmission line 72.

In this configuration, the high-frequency transmission line 72 includes the connection structure between the high-frequency transmission line conductor and the laminated waveguide of the above-described embodiment. The high-frequency transmission line 72 includes a microstrip line 72*a* which is formed on the surface of a dielectric substrate 70 composed of a plurality of dielectric layers, a first laminated waveguide 72*c* connected to the microstrip line 72*a* through a conversion part 72*b*, and a second laminated waveguide 72*d* connected to the first laminated waveguide 72*c*.

An end portion of the microstrip line 72*a* is connected to the high-frequency oscillator 71 via a bonding wire, and a transmitting antenna 73 is connected to an end portion of the second laminated waveguide 72*d*. It should be noted that only part of the whole structure of the dielectric substrate 70 is illustrated.

The high-frequency oscillator 71 includes an MMIC or the like that functions as a Gunn oscillator using a Gunn diode, an IMPATT oscillator using an IMPATT diode, or an oscillator using a transistor such as an FET (Field Effect Transistor), and generates high-frequency signals. The high-frequency oscillator 71 is mounted on the dielectric substrate 70 together with other electronic components such as, for example, a semiconductor device, a capacitor, a resistor, and an inductor.

The transmitting antenna 73 which is provided on a back surface side of the dielectric substrate 70 is realized by a slot antenna. That is to say, by forming a cutout portion (slot) in a portion of a conductor layer formed on the back surface of the dielectric substrate 70 where an end portion of the second laminated waveguide 72*d* is positioned, it is possible to form a slot antenna as the transmitting antenna 73.

The transmitting antenna 73 can be realized by a patch antenna other than the slot antenna. Moreover, the cutout portion may be used as an antenna port in lieu of using it as the slot antenna; in this case, one end of a waveguide is connected to the antenna port, and the other end of the waveguide is connected to a transmitting antenna.

The transmitter T shown in FIGS. 6A to 6C operates in the following manner.

High-frequency signals of 77 GHz, for example, are generated by the high-frequency oscillator 71 mounted on the surface of the dielectric substrate 70. The high-frequency signals propagate through the microstrip line 72*a* formed on the surface of the dielectric substrate 70 and further propagate through the first laminated waveguide 72*c* and the second laminated waveguide 72*d* formed inside the dielectric substrate 70 via the conversion part 72*b* formed on the surface of the same dielectric substrate 70. The high-frequency signals are finally radiated from the transmitting antenna formed on the back surface of the dielectric substrate 70.

According to such a transmitter T, it is possible to transmit high-frequency signals with low loss and stably from the microstrip line 72*a*, which is provided on one surface of the dielectric substrate 70 where electronic components are mounted, to the transmitting antenna or a transmitting antenna port which is provided on the opposite surface. That is to say, since the high-frequency transmission line 72 is formed by integrating with the dielectric substrate 70, it is possible to propagate high-frequency signals stably without loss resulting from a line misalignment or the like even with expansion/contraction or the like of members due to mechanical vibration or temperature variations. When such a transmitter T is used in a state of being mounted on a moving object, it is suitable since it is robust against vibration or environmental changes.

The receiver R shown in FIGS. 7A to 7C includes a receiving antenna 74 configured to capture high-frequency signals, a high-frequency transmission line 75 configured to transmit the high-frequency signals captured by the receiving antenna 74, and connected to one end of the receiving antenna 74, and a high-frequency detector 76 configured to detect the high-frequency signals transmitted by the high-frequency transmission line 75, and connected to the other end of the high-frequency transmission line 75. Moreover, preferably, a low-noise amplifier 77 is connected to the high-frequency detector 76 of the high-frequency transmission line 75 at a position as close as possible.

In this configuration, the high-frequency transmission line 75 includes the connection structure between the high-frequency transmission line conductor and the laminated waveguide of the above-described embodiment. The high-frequency transmission line 75 includes a microstrip line 75a which is formed on the surface of a dielectric substrate 70 composed of a plurality of dielectric layers, a first laminated waveguide 75c connected to the microstrip line 75a through a conversion part 75b, and a second laminated waveguide 75d connected to the first laminated waveguide 75c.

The high-frequency detector 76 is connected to an end portion of the microstrip line 75a via a bonding wire, the low-noise amplifier 77 is connected in the part halfway between them via a bonding wire, and the receiving antenna 74 is connected to an end portion of the second laminated waveguide 75d. It should be noted that only part of the whole structure of the dielectric substrate 70 is illustrated.

The receiving antenna 74 has the same configuration as the transmitting antenna 73 of the transmitter T. That is to say, the transmitting antenna 73 and the receiving antenna 74 have only different names but have substantially the same configuration. Similar to the transmitter T, a receiving antenna port may be provided in lieu of the receiving antenna 74, one end of a waveguide may be connected to the receiving antenna port, and the other end of the waveguide may be connected to the receiving antenna.

The receiver R shown in FIGS. 7A to 7C operates in the following manner.

When high-frequency signals are captured by the receiving antenna 74 formed on the back surface of the dielectric substrate 70, the high-frequency signals propagate through the second laminated waveguide 75d and the first laminated waveguide 75c and further propagate through the microstrip line 75a formed on the surface of the same dielectric substrate 70 via the conversion part 75b formed on the surface of the dielectric substrate 70. The high-frequency signals are amplified by the low-noise amplifier 77 and finally detected by the high-frequency detector 76.

According to such a receiver R, it is possible to transmit high-frequency signals with low loss and stably from the receiving antenna or a receiving antenna port to the microstrip line which is provided on one surface of the dielectric substrate 70 where electronic components are mounted. That is to say, since the high-frequency transmission line 75 is formed by integrating with the dielectric substrate 70, it is possible to propagate high-frequency signals stably without loss resulting from a line misalignment or the like even with expansion/contraction or the like of members due to mechanical vibration or temperature variations. When such a receiver R is used in a state of being mounted on a moving object, it is suitable since it is robust against vibration or environmental changes.

The transceiver TR shown in FIG. 8 includes a transmitting part T' having the same configuration as the transmitter T shown in FIGS. 6A to 6C, a receiving part R' having the same configuration as the receiver R shown in FIGS. 7A to 7C, a branch 78 configured to branch the high-frequency signals generated by the high-frequency oscillator 71, and provided to the microstrip line 72a of the transmitting part T', a mixer 79 that mixes the high-frequency signals branched by the branch 78 as local signals and the high-frequency signals captured by the receiving antenna 74 with each other to output intermediate-frequency, signals. In the transceiver TR, the same configurations as those of the transmitter T and the receiver R shown in FIGS. 6A to 6C and 7A to 7C are denoted by the same reference numerals.

In the transceiver TR, the high-frequency transmission line 72 and the high-frequency transmission line 75 have the same configurations as those shown in FIGS. 6A to 6C and 7A to 7C, respectively, and thus the cross-sectional view thereof and the plan view thereof on the other surface side are omitted.

In the transceiver TR shown in FIG. 8, the branch 78 is provided at an output terminal of the high-frequency oscillator 71 of the transmitting part T', whereby the high-frequency signals generated by the high-frequency oscillator 71 are bifurcated by the branch 78. One of the bifurcated signals are outputted to the transmitting antenna 73, the other signals are outputted to the receiving part R' as local signals, and the local signals are inputted to the mixer 79 of the receiving part R'.

The branch 78 includes a rat-race 78a having first, second, third, and fourth terminals in which the electrical length between respective terminals is $\lambda/4$ (however, the electrical length between the first and the fourth terminals is $3\lambda/4$) and a termination resistor 78b connected to the third terminal of the rat-race 78a. In the rat-race 78a, the first terminal thereof is connected to the microstrip line 72a and the fourth terminal thereof is connected to the mixer 79 by another microstrip line.

With such a configuration, it is possible to bifurcate the high-frequency signals inputted through the first terminal to be outputted through the second terminal and the fourth terminal, respectively. Here, the branch 78 can be realized by a high-frequency switch element, another hybrid circuit or a circulator. The hybrid circuit can be realized, for example, by a directional coupler, a branch line, a Magic T, or the like, in addition to the rat-race.

The transceiver TR is preferably provided with a circular conductor 80 which is formed on one surface of the dielectric substrate 70 so as to surround the transmitting part T' and the receiving part R' and to which a sealing cap is to be attached. On the circular conductor 80, a sealing cap that seals the transmitting part T' and the receiving part R' is attached (not shown). The sealing cap has at least a bonding portion with the circular conductor 80, which is made from metal such as gold (Au), and is bonded to the circular conductor 80 via a filler material such as gold.

In the transceiver TR, a transmitting antenna port and a receiving antenna port may be provided in lieu of the transmitting antenna 73 and the receiving antenna 74, respectively, one end of a waveguide may be connected to the respective ports, and the other end of the waveguide may be connected to the transmitting antenna and the receiving antenna, respectively.

Moreover, the transceiver TR may be further provided with an IF part on the same dielectric substrate 70 as a circuit which processes the intermediate-frequency signals outputted from the mixer 79.

The transceiver TR shown in FIG. 8 operates in the following manner.

In the transmitting part T', high-frequency signals of 77 GHz, for example, are generated by the high-frequency oscillator 71 mounted on the surface of the dielectric substrate 70, and the high-frequency signals are inputted to the first terminal of the branch 78 and bifurcated to be outputted through the second terminal and the fourth terminal. The high-frequency signals outputted through the second terminal, which are one of the bifurcated high-frequency signals, propagate through the microstrip line 72a formed on the surface of the dielectric substrate 70 and further propagate through the first laminated waveguide 72c and the second laminated waveguide 72d formed inside the dielectric substrate 70 via the conversion part 72b formed on the surface of the same dielectric substrate 70. The high-frequency signals are radiated from the transmitting antenna 73 formed on the back surface of the dielectric substrate 70. Moreover, the high-frequency signals outputted through the fourth terminal of the branch 78, which are the other of the bifurcated high-frequency signals propagate through another microstrip line formed on the surface of the same dielectric substrate 70 to be inputted to the mixer 79 on the side of the receiving part R'.

In the receiving part R', when the high-frequency signals are captured by the receiving antenna 74 formed on the other surface of the dielectric substrate 70, the high-frequency signals propagate through the high-frequency transmission line 75, amplified by the low-noise amplifier 77, and inputted to the mixer 79. The mixer 79 mixes the high-frequency signals captured by the receiving antenna 74 with local signals to output intermediate-frequency signals.

According to such a transceiver TR, since a complex high-frequency circuit such as a transmitting/receiving circuit can be configured on the surface of a board using a microstrip line, high-frequency signals which are inputted/outputted from the high-frequency circuit to an external space and used for transmission/reception are allowed to propagate with low loss to a back surface side of the board through the laminated waveguide formed inside the board to be effectively inputted/outputted from an outer surface side of the board. Therefore, the transceiver can have a small size and good transmission/reception characteristics. That is to say, since a high-frequency circuit, a waveguide, and an antenna can be integrated as one configuration by the connection structure of the invention, assembling is easier than the conventional configuration which uses a metal waveguide. Moreover, since the waveguide itself is configured by a laminated waveguide, a complex and fine structure can be easily designed and produced by employing the design rules of a laminated ceramic substrate.

Moreover, as described above, since the high-frequency transmission lines 72 and 75 are formed by integrating with the dielectric substrate 70, it is possible to propagate high-frequency signals stably without loss resulting from a line misalignment or the like even with expansion/contraction or the like of members due to mechanical vibration or temperature variations. When such a transceiver TR is used in a state of being mounted on a moving object, it is suitable since it is robust against vibration or environmental changes.

The transceiver TR2 shown in FIG. 9 further includes N (N is an integer of 2 or more) pieces of transmitting antennas 73 and N pieces of receiving antennas 74 to the transceiver TR shown in FIG. 8 and N pairs of high-frequency transmission lines 72 and 75 which are connected to the respective antennas. In the example shown in the figure, three pairs of high-frequency transmission lines 72 and three pairs of high-frequency transmission lines 75 are provided.

As shown in FIG. 9, the high-frequency transmission lines 72 and 75 may have a configuration such that input sides of 1-to-N changeover switches 81 and 82 are connected to end portions of a pair of microstrip lines 72a and 75a, N pairs of conversion parts 72b and 75b are connected to the respective N terminals which are the output sides of these changeover switches 81 and 82, and N pairs of first laminated waveguides 72c and 75c and N pairs of second laminated waveguides 72d and 75d are connected to the N pairs of conversion parts 72b and 75b.

Moreover, the transceiver TR2 further includes a bias line 83 that supplies a bias voltage to an MMIC or the like. Here, the IF part is omitted without being shown.

According to the transceiver TR2 shown in FIG. 9, in addition to the same operational advantages as those of the transceiver TR shown in FIG. 8, the transceiver has a function of dynamically changing the directivity of an antenna with the changeover switches 81 and 82, thus enabling the direction of transmitting/receiving high-frequency signals to be changed in terms of space and time. According to the connection structure of the invention, even complex circuits can be easily designed and produced, and thus the transceiver TR2 having such a function can be suitably implemented.

Another embodiment of the invention is a radar apparatus. For example, the radar apparatus includes the transceiver TR shown in FIG. 8 and a detecting device configured to detects a distance and a relative speed of a target object based on the intermediate-frequency signals from the mixer 79.

The radar apparatus is realized by an FM-CW radar in which a voltage-controlled oscillator is used for a high-frequency oscillator. Moreover, the radar apparatus may be realized by a pulse radar, a two-frequency CW radar, an FM pulse radar or a spectrum spreading radar.

The detecting device includes the above-described high-frequency detector and calculates a distance to the target object based on the intermediate-frequency signals obtained by receiving electric waves (echo waves) which have been radiated from a transmitting/receiving antenna and reflected by the target object. The detecting device is realized by a microcomputer, for example.

According to such a radar apparatus, since the radar apparatus uses the circuit board having the connection structure according to the invention, it is possible to configure the radar apparatus in a small size and an integrated form. Accordingly, it is possible to reduce the number of components and decrease the magnitude of a moment applied to each constituent element, and thus the radar apparatus has excellent mass productivity and operational stability.

According to the invention, it is possible to provide a high-frequency transmission line connection structure and a circuit board having the same, which is capable of achieving an impedance matching between a microstrip line and a laminated waveguide, reducing characteristic variations even when manufacturing defects such as so-called lamination misalignments occur, reducing a conversion loss, and improving the degree of freedom in disposing another line conductor and a high-frequency circuit element on a surface where a strip conductor is formed.

Moreover, by using such a circuit board, it is possible to provide a high-frequency module that constitutes a transceiver or the like, having a small size and good transmitting/receiving function and to provide a radar apparatus having the high-frequency module.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A high-frequency transmission line connection structure, for electrically connecting a high-frequency transmission line conductor and a laminated waveguide to each other, comprising:

the laminated waveguide comprising a first laminated waveguide, a second laminated waveguide, and a common line part between the first laminated waveguide and the second laminated waveguide, wherein the first laminated waveguide comprises:
- a sub-line part, which is connected to the high-frequency transmission line conductor, comprising a dielectric layer, a pair of sub-line part main conductor layers that oppose each other in a thickness direction with the dielectric layer interposed therebetween, and an array of sidewall-forming via-hole conductors that electrically connects the pair of sub-line part main conductor layers in the thickness direction;
- a main-line part, which is connected to the sub-line part, comprising a dielectric layer thicker than the dielectric layer of the sub-line part, a pair of main-line part main conductor layers that oppose each other in the thickness direction with the dielectric layer interposed therebetween, and an array of sidewall-forming via-hole conductors that electrically connects the pair of main-line part main conductor layers in the thickness direction; and
- a conversion part composed of one layer of the pair of sub-line part main conductor layers and one layer of the pair of main-line part main conductor layers, both layers being formed as one, and the conversion part being electrically connected to the high-frequency transmission line conductor, the second laminated waveguide sharing at least one dielectric layer among the dielectric layers of the first laminated waveguide, comprises:
- a pair of main conductor layers that oppose each other in the thickness direction with a plurality of dielectric layers comprising the shared dielectric layer interposed therebetween; and
- an array of sidewall-forming via-hole conductors that electrically connects the pair of main conductor layers in the thickness direction,
- wherein one layer of the pair of main conductor layers is disposed closer to one side in the thickness direction than the conversion part, and the other layer of the pair of main conductor layers is disposed closer to one side in the thickness direction than the other layer of the pair of sub-line part main conductor layers, the common line part comprises:
- a pair of common line main conductor layers that oppose each other in the thickness direction with the dielectric layers of both the first laminated waveguide and the second laminated waveguide interposed therebetween; and
- an array of sidewall-forming via-hole conductors that electrically connects the pair of common line main conductor layers in the thickness direction, and
- wherein one layer of the pair of common line main conductor layers is electrically connected to the conversion part, and the other layer of the pair of common line main conductor layers is electrically connected to the other layer of the pair of main conductor layers.

2. The high-frequency transmission line connection structure according to claim 1, wherein:
the high-frequency transmission line conductor is a microstrip line comprising a strip conductor and a ground conductor which oppose each other in the thickness direction with the dielectric layer, interposed by the pair of the sub-line part main conductor layers, interposed therebetween; and
the strip conductor is electrically connected to the conversion part.

3. A circuit board having first and second surfaces, comprising:
the high-frequency transmission line connection structure according to claim 2,
wherein the strip conductor and the conversion part are provided on the first surface.

4. A high-frequency module, comprising:
the circuit board according to claim 3;
an oscillator configured to generate high-frequency signals, mounted on the first surface of the circuit board, and connected to a side of the microstrip line opposite to the conversion part; and
a transmitting antenna configured to radiate the high-frequency signals, provided on the second surface of the circuit board, and connected to the second laminated waveguide.

5. A high-frequency module, comprising:
the circuit board according to claim 3;
a receiving antenna configured to capture high-frequency signals, provided on the second surface of the circuit board, and connected to the second laminated waveguide; and
a detector configured to detect the high-frequency signals, mounted on the first surface of the circuit board, and connected to a side of the microstrip line opposite to the conversion part.

6. A high-frequency module, comprising:
the circuit board according to claim 3;
an oscillator configured to generate high-frequency signals, mounted on the first surface of the circuit board, and connected to a side of the microstrip line opposite to the conversion part; and
a transmitting antenna port provided on the second surface of the circuit board and connected to the second laminated waveguide.

7. A high-frequency module, comprising:
the circuit board according to claim 3;
a receiving antenna port provided on the second surface of the circuit board and connected to the second laminated waveguide; and
a detector configured to detect the high-frequency signals, mounted on the first surface of the circuit board, and connected to a side of the microstrip line opposite to the conversion part.

8. A high-frequency module, comprising:
a circuit board that comprises first and second high-frequency transmission line connection structures according to claim 2, and has a first surface on which the strip conductor and the conversion part of the first and second connection structures are provided;
an oscillator configured to generate high-frequency signals, mounted on the first surface of the circuit board, and connected to a microstrip line of the first connection structure;
a branch configured to branch high-frequency signals generated by the oscillator, and provided in a microstrip line of the first connection structure;
a transmitting antenna configured to radiate one of the high-frequency signals branched by the branch, provided on a second surface of the circuit board, and connected to a second laminated waveguide of the first connection structure;
a receiving antenna configured to capture high-frequency signals, provided on the second surface of the circuit board, and connected to a second laminated waveguide of a second connection structure; and
a mixer that mixes the other one of the high-frequency signals branched by the branch and the high-frequency signals captured by the receiving antenna with each other to output intermediate-frequency signals.

9. A radar apparatus, comprising:
the high-frequency module according to claim 8; and
a detecting device configured to detect at least a distance or a relative speed of a target object based on intermediate-frequency signals from the mixer.

10. A high-frequency module comprising:
a circuit board that comprises first and second high-frequency transmission line connection structures according to claim 2, and has a first surface on which the strip conductor and the conversion part of the first and second connection structures are provided;
an oscillator configured to generate high-frequency signals, mounted on the first surface of the circuit board, and connected to a microstrip line of the first connection structure;
a branch configured to branch high-frequency signals generated by the oscillator, and provided in a microstrip line of the first connection structure;
a transmitting antenna port provided on a second surface of the circuit board and connected to a second laminated waveguide of the first connection structure;
a receiving antenna port provided on the second surface of the circuit board and connected to a second laminated waveguide of the second connection structure; and
a mixer configured to output intermediate-frequency signals using the high-frequency signals branched by the branch.

11. A radar apparatus, comprising:
the high-frequency module according to claim 10;
a transmitting antenna and a receiving antenna that are connected to the transmitting antenna port and the receiving antenna port, respectively; and
a detecting device configured to detect at least a distance or a relative speed of a target object based on intermediate-frequency signals from the mixer.

* * * * *